United States Patent Office 3,328,257
Patented June 27, 1967

3,328,257
PREPARATION OF MICROCAPSULES
Marcel Nicolas Vrancken, Berchem-Antwerp, and Daniël Aloïs Claeys, Mortsel-Antwerp, Belgium, assignors to Gevaert Photo-Producten N.V., Mortsel-Antwerp, Belgium, a Belgian company
No Drawing. Filed Feb. 19, 1963, Ser. No. 259,739
Claims priority, application Netherlands, Feb. 20, 1962, 275,045
4 Claims. (Cl. 167—83)

The invention relates to the encasing of water-immiscible solid or liquid products in capsules of gelatin derivatives.

As early as 1931 it has been stated by Bungenberg de Jong and Kaas that when dispersing in the form of droplets a small amount of an organic liquid in a hydrophilic sol or in a mixture of hydrophilic sols, and by causing coacervation of the latter, all organic liquid droplets are finally encased within coacervate droplets. If the coacervated colloid is gelatin, the formed encapsulating film can be gelled by cooling (Biochem. Z. 232, 338–345, 1931).

In the French patent specification 1,165,805 a method for the preparation of oil-containing microscopic capsules from a gelled hydrophilic colloid material is described. According to this method the oil is dispersed in an aqueous solution of a gellable, hydrophilic colloid material. By coacervating the colloidal solution by means of a coacervating agent an encapsulating film is formed around the droplets, and individual microscopic oil-containing capsules are formed. The colloidal envelop of the capsules is gelled by cooling. If necessary it can be hardened.

According to one embodiment of the above patent specification oil is emulsified in a mixture of two compatible aqueous sols. Coacervation occurs and capsules are formed by adjusting the pH of the mixture. The two sols contain different hydrophilic colloid materials having opposite electric charges in the mixture, at least one of the colloids being gellable.

According to another embodiment an emulsion is formed by mixing the oil with only one gellable hydrophilic colloidal sol whereupon coacervation occurs by adding a strongly concentrated salt solution to the emulsion. The colloid material is deposited around the oil droplets and the capsule-forming colloid material is gelled by cooling.

It has now been found that substances can be encapsulated by using as only gellable colloid material gelatin derivatives having a solubility dependent on the pH.

In the process according to the invention, particles of a sparingly water-soluble, or water-insoluble solid single substance or composition, or droplets of a water-immiscible liquid single substance or composition are encased in capsules of a gellable hydrophilic colloid material which can be coacervated, whereby a colloidal encapsulating film is formed around the individual particles or droplets, said film being gelled and occasionally hardened, and wherein a gelatin derivative, the solubility of which depends on the pH of the medium is used as gellable hydrophilic colloid material and the coacervation of said gelatin derivative is obtained by acidifying the medium.

In general, for applying the present invention all acid-coagulable gelatin derivatives may be used, said gelatin derivatives being formed by allowing gelatin to react with an aromatic compound bearing a group which normally reacts with gelatin.

By gelatin derivatives having a solubility dependent on the pH are meant gelatin derivatives which are soluble in aqueous alkaline medium but which can be precipitated from these solutions by acidifying to pH 5 or lower.

Examples of such acid-coagulable gelatin derivatives are: the reaction products of gelatin and aromatic or aliphatic anhydrides, of gelatin and compounds bearing reactive halogen atoms, of gelatin and isocyanates and of gelatin and N-arylvinyl sulfonamides.

Among the aromatic and aliphatic anhydrides can be mentioned: phthalic anhydride, benzoic anhydride, trimellitic anhydride, pyromellitic anhydride, sulfophthalic anhydride, dimethyl- and dibutenyl-substituted tetrahydrophthalic anhydride, maleic anhydride, chloromaleic anhydride, succinic anhydride and isatoic anhydride.

A first series of compounds bearing reactive halogen atoms comprises those bearing chlorosulfonyl groups such as benzene sulfochloride, p-methoxy-benzene sulfochloride, p-phenoxy-benzene sulfochloride, p-chloro-benzene sulfochloride, p-bromo-benzene sulfochloride, p-toluene sulfochloride, m-nitrobenzene sulfochloride, m-chlorosulfonyl benzoyl chloride, m-carboxybenzene sulfochloride, m-carboxy-p-bromo-benzene sulfochloride, β-naphthalene sulfochloride and 4-phenyl-5-(p-chlorosulfonylphenyl)-2-imidazolone. A second series of compounds bearing reactive halogen atoms comprises those bearing fluorosulfonyl groups such as: p-amino-benzene sulfofluoride, m - amino - benzene sulfofluoride, m,p-diamino-benzene sulfofluoride, p-toluene sulfofluoride, m-fluorosulfonyl benzoic acid, 2-hydroxy-5-fluorosulfonyl benzoic acid and m-fluorosulfonyl benzoylacetamide. A third series of compounds bearing reactive halogen atoms comprises those bearing carboxychloride groups or carboxybromide groups such as: phthalyl chloride, benzoyl chloride, p-nitrobenzoyl chloride and p-carboxybenzoyl bromide. A fourth series of compounds bearing reactive halogen atoms comprises those bearing free halogen atoms such as p-bromomethyl benzoic acid, n-amyl chloroformate, benzyl chloroformate, methoxyethyl chloroformate, methoxypropyl chloroformate, phenoxyethyl chloroformate, cyclohexyl chloroformate, cyclopentyl chloroformate, mucochloloric acid, mucobromic acid, mucochlorobromic acid, 1,3,5-tri-(chloroacetyl)-perhydro-1,3,5-triazine, 1,3,5 - tri-(bromo-acetyl) - perhydro - 1,3,5 - triazine and the potassium salt of 4-fluoro-3-nitrobenzene sulfonic acid.

As isocyanates which form with gelatin derivatives which are coagulable in acid medium can be mentioned: phenyl isocyanate, p-tolyl isocyanate, p-bromophenyl isocyanate, p-chlorophenyl isocyanate and naphthyl isocyanate.

Among the N-arylvinyl sulfonamide derivatives of gelatin the following are most suited: the reaction products of gelatin and N-vinyl sulfonic acid anilide, of gelatin and N-vinyl sulfonic acid-p-phenetidide, of gelatin and N-vinyl sulfonic acid-p-toluidide, and of gelatin and N-vinyl sulfonic acid-N-methyl anilide.

These gelatin derivatives allow to incapsulate all single substances or compositions which can be dispersed in water. Hence the solid substances which are sparingly or not at all water-soluble and the liquid substances which are immiscible with water are most suited. By "compositions" are meant: mixtures of two or more solid substances which are sparingly or not at all water-soluble, solutions in a water-immiscible liquid of one or more solid substances which are less soluble in water than in the water-immiscible liquid, or mixtures of two or more water-immiscible liquids. Examples of said solid or liquid substances are: barium sulfate, active carbon, synthetic, vegetable and animal oils and fats, organic solvents such as carbon tetrachloride, toluene, dioxan, butyl acetate, dimethyl phthalate and solutions, for instance of organic dyes, in a water-immiscible organic solvent such as toluene.

The size of the microscopic capsules, which can be formed in an aqueous solution of a gelatin derivative by acidifying the solution, can vary within wide limits namely from some hundreds of microns to a fraction of a micron. Said size depends mainly on the degree of dispersion of the particles or droplets in the aqueous medium.

If these particles or droplets are small and dispersed in a large amount of water, very small capsules can be prepared. However, when the distances between the dispersed particles or droplets are relatively small, more than one particle or droplet shall be encased in one single capsule and also agglomerates of capsules like bunches of grapes may be formed.

The encapsulating film formed around the dispersed particles or droplets by acidifying the medium can be gelled by cooling. If desired the formed capsules can be hardened by known hardening methods. After separating the capsules from the aqueous medium they can be dried by known methods e.g. air-drying, spray-drying and freeze-drying.

The method according to the invention shows many advantages with regard to the methods known thus far. So it is possible to prepare capsules, the envelops of which remain insoluble in acid medium even when heated, but which readily dissolve in weakly alkaline medium. This can be of importance for some applications e.g. in medical science. Indeed, medicines can be administered enclosed in capsules resisting the acid medium of the stomach and dissolving in the intestines whereby the encapsulated substances are released.

These capsules, the solubility of which can be regulated by the pH, can advantageously be used in other applications e.g. in photography (the encapsulated substance may be set free at choice during a certain step of the processing), in special processes such as electrophotography, dry-processing, thermal processes and the like.

Capsules composed of gelatin derivatives according to the invention can be obtained by different manufacturing methods.

According to a first embodiment of the invention, the solid water-insoluble substance or the water-immiscible liquid is dispersed in the aqueous solution of the gelatin derivative. The dispersion obtained is acidified, whereby the gelatin derivative coacervates and forms an encapsulating film around the solid or liquid particle. This film is gelled by cooling and occasionally can be hardened with known hardening agents. Finally, the capsules formed can be separated and dried.

According to a second embodiment of the invention, the water-immiscible solid or liquid substance is dispersed in an aqueous solution of common gelatin, whereupon by reacting the gelatin with one of the above mentioned products, a gelatin derivative is formed and coacervation can be caused by acidification.

According to a third embodiment of the invention, the water-insoluble solid substance of the water-immiscible liquid substance is dispersed in an aqueous solution of the gelatin derivative which is already coacervated but not yet gelled. The coacervating gelatin derivative forms an encapsulating film around the solid or liquid substances, whereupon the gelatin derivative is gelled and the capsules formed are separated in the known way.

The following examples illustrate the invention.

*Example 1*

200 g. of gelatin with isoelectric point 4.8 are dissolved in 1800 cm.³ of water. The solution is heated to 45° C. and the pH raised to pH 10.

While strongly stirring a solution of 40 g. phthalic anhydride in 450 cm.³ of acetone are added, the pH being kept at pH 10 by the addition of N sodium hydroxide.

After 30 minutes the pH of the solution is adjusted to pH 4 by the addition of N sulfuric acid, thus causing the formed reaction product of gelatin and phthalic anhydride to flocculate. The flocculated gelatin derivative is washed with cold water and dried.

40 g. of the gelatin derivative thus obtained are dissolved in 800 cm.³ of water of 45° C. Thereupon, while strongly stirring, 160 cm.³ of paraffin oil are dispersed in this solution to the size of the droplets is about $20\mu$.

By adding N acetic acid, the pH of the solution is adjusted to 4.5 whereby the gelatin derivative is deposited on the oil droplets forming an enclosing envelope. Then the solution is slowly cooled to 10° C. while stirring, thus causing the formed capsules of gelatin derivative to solidify. After keeping at 10° C. for 2 h. so that the capsules of gelatin derivative obtained the desired firmness, the dispersion is filtered and the microcapsules are washed with cold water. The microcapsules are once again dispersed in 500 cm.³ of water at 10° C. containing 80 cm.³ of a 1% solution of chrome alum. By this treatment the capsules of gelatin derivative are completely insolubilized.

The thus obtained capsules wherein oil droplets are enclosed in envelops of the gelatin derivatives, are separated by filtration and spray-dried.

*Example 2*

1.750 cm.³ of a 10% aqueous solution of a gelatin with isoelectric point 9 at 45° C. are adjusted to pH 10 by adding 5 N sodium hydroxide.

To this solution are added a solution in 350 cm.³ of acetone of 50 g. of p-bromomethyl benzoic acid and 175 cm.³ of dimethylformamide. The pH of the solution is kept at pH 10 by the addition of 5 N sodium hydroxide.

After about 30 minutes the solution is brought at pH 4 by means of 2 N hydrochloric acid thus causing the gelatin derivative to flocculate. The gelatin derivative is redissolved in water at pH 8, solidified, noodled, washed and dried.

In 50 cm.³ of a 5% solution of said gelatin derivative at 45° C., 10 cm.³ of toluene is dispersed till the size of the droplets is about $50\mu$. By the addition of acetic acid, the solution is adjusted to pH 4.3 causing the gelatin derivative to deposit around the toluene droplets.

Further treatment is carried out as in Example 1.

*Example 3*

1000 g. of a gelatino-silver halide emulsion containing about 80 g. of gelatin are heated till 40° C. and adjusted to pH 10 by the addition of 5 N sodium hydroxide. Then a solution in 60 cm.³ of dimethylformamide of 10 g. of m-fluorosulfonyl benzoic acid is added. The pH of the medium is kept at pH 10 by means of 5 N sodium hydroxide. After 30 minutes it is brought at pH 7 by the addition of N sulfuric acid.

Thereupon a solution of 20 g. of N-hexadecyl-1-hydroxy-2-naphthamide color coupler in 150 cm.³ of toluene is dispersed in the emulsion. The size of the droplets is of $1-2\mu$. By adding N acetic acid, the pH is adjusted to pH 4.5 so that the gelatin derivative silver halide emulsion is coacervated and forms tiny encapsulating film around the droplets of color coupler solution.

The emulsion is slowly cooled till 10° C. thus causing the capsules to gel. The encased emulsion droplets thus obtained are separated, washed with cold water and hardened with chrome alum as described in Example 1.

*Example 4*

While stirring, 400 cm.³ of a 5% aqueous solution of the reaction product of gelatin and phthalic anhydride at 45° C. are adjusted to pH 4.5 by adding acetic acid thus causing the gelatin derivative to coacervate. Then 70 cm.³ of carbon tetrachloride are dispersed in this mixture. Stirring is continued for a while thus causing the coacervated gelatin derivative to deposit around the carbon tetrachloride droplets.

Thereupon the solution is cooled till 10° C. while stirring so that the gelatin derivative is gelled. The capsules with the encased droplets are allowed to settle and then washed with cold water. They are separated and dried.

We claim:
1. Process for encasing particles of an at least substantially water-insoluble solid composition in discrete capsules of an acid-coagulable, water-soluble, film-forming gelatin derivative, said derivative being the reaction product of gelatin and an organic compound bearing a reactive group selected from the group consisting of an anhydride radical, a halogen atom, an isocyanate radical, and a sulfonamide radical, comprising the steps of finely dispersing said solid composition in an aqueous solution of said gelatin derivative, coacervating said gelatin derivative by acidifying the medium, whereby a colloidal encapsulating film of said gelatin derivative is formed around the individual particles, gelling said encapsulating film by cooling while agitating said medium, and separating the capsules formed.

2. Microscopic capsules obtained by applying the process of claim 1.

3. Process for encasing droplets of a water-immiscible liquid composition in discrete capsules of an acid coagulable, water-soluble, film-forming gelatin derivative, said derivative being the reaction product of gelatin and an organic compound bearing a reactive group selected from the group consisting of an anhydride radical, a halogen atom, an isocyanate radical, and a sulfonamide radical, comprising the steps of finely dispersing said liquid composition in an aqueous solution of said gelatin derivative, coacervating said gelatin derivative by acidifying the medium, whereby a colloidal encapsulating film of said gelatin derivative is formed around the individual droplets, gelling said encapsulating film by cooling while agitating said medium and separating the capsules formed.

4. Microscopic capsules obtained by applying the process of claim 3.

References Cited

UNITED STATES PATENTS

| | | | |
|---|---|---|---|
| 2,614,928 | 10/1952 | Yutzy et al. | 96—76 X |
| 2,763,552 | 9/1956 | Van Campen et al. | 96—76 X |
| 3,016,308 | 1/1962 | MacCaulay | 167—83 |
| 3,041,288 | 6/1962 | Anthony | 167—83 |
| 3,041,289 | 6/1962 | Katchen et al. | 167—83 |
| 3,069,370 | 12/1962 | Jensen et al. | 167—83 |
| 3,190,837 | 6/1965 | Brynko et al. | 252—316 |

FOREIGN PATENTS 1,165,805  10/1958  France.

ALBERT T. MEYERS, *Primary Examiner.*
FRANK CACCIAPAGLIA, JR., JULIAN S. LEVITT,
*Examiners.*
G. A. MENTIS, *Assistant Examiner.*